US 11,124,131 B2

(12) United States Patent
Park et al.

(10) Patent No.: US 11,124,131 B2
(45) Date of Patent: Sep. 21, 2021

(54) VERTICALLY FOLDABLE CAMERA MONITORING SYSTEM

(71) Applicants: Hyundai Motor Company, Seoul (KR); Kia Motors Corporation, Seoul (KR); AMOTECH CO., LTD., Incheon (KR); Hyundai Mobis Co., Ltd., Seoul (KR)

(72) Inventors: Jong Min Park, Seoul (KR); Jong Uk Kim, Gyeonggi-do (KR); Geon Pyo Kim, Seoul (KR)

(73) Assignees: Hyundai Motor Company, Seoul (KR); Kia Motors Corporation, Seoul (KR); AMOTECH CO., LTD., Incheon (KR); Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/700,531

(22) Filed: Dec. 2, 2019

(65) Prior Publication Data

US 2020/0398767 A1    Dec. 24, 2020

(30) Foreign Application Priority Data

Jun. 19, 2019    (KR) .................. 10-2019-0072673

(51) Int. Cl.
*B60R 11/04*    (2006.01)
*G03B 17/56*    (2021.01)
(Continued)

(52) U.S. Cl.
CPC ............. *B60R 11/04* (2013.01); *F16M 11/10* (2013.01); *F16M 11/12* (2013.01); *F16M 11/18* (2013.01);
(Continued)

(58) Field of Classification Search
CPC ......... B60R 11/00; B60R 11/04; G03B 17/56; F16M 11/04; F16M 11/12; F16M 11/10; F16M 11/18
(Continued)

(56) References Cited

U.S. PATENT DOCUMENTS 5,876,005 A * 3/1999 Vasconi ................. F16M 11/10
                                                            248/276.1
7,891,886 B2 * 2/2011 Schuetz ................. H04N 5/247
                                                            396/427
(Continued)

FOREIGN PATENT DOCUMENTS

DE    2013202300    *  8/2013    ............. B60S 11/04
KR    2007-0063485 A    6/2007
(Continued)

*Primary Examiner* — Clayton E. LaBalle
*Assistant Examiner* — Kevin C Butler
(74) *Attorney, Agent, or Firm* — Mintz Levin Cohn Ferris Glovsky and Popeo, P.C.; Peter F. Corless (57) ABSTRACT

A vertically foldable camera monitoring system includes a base fixedly mounted to a body of a vehicle, and a camera module coupled to the base, the camera module configured to provide a field of view at lateral and rear sides of the vehicle. The camera module includes a damper unit connected to the base and configured to be extended or retracted in length by a driving unit, a support member connected to the damper unit while supporting a camera, and a horizontal bar engaged at a first end with a guide slot provided at the support member while being disposed at a second end adjacent to the damper unit. The driving unit drives the camera module to be extended or to be rotated in an upward direction.

11 Claims, 5 Drawing Sheets

(51) Int. Cl.
  *F16M 11/12* (2006.01)
  *F16M 11/18* (2006.01)
  *F16M 11/10* (2006.01)
  *B60R 11/00* (2006.01)

(52) U.S. Cl.
  CPC ...... *G03B 17/561* (2013.01); *B60R 2011/004* (2013.01); *B60R 2011/0085* (2013.01)

(58) Field of Classification Search
  USPC .................................. 348/148; 396/421, 428
  See application file for complete search history.

(56) References Cited

U.S. PATENT DOCUMENTS

| | | | | |
|---|---|---|---|---|
| 8,753,025 | B2* | 6/2014 | Suman | B60R 11/04 |
| | | | | 396/448 |
| 8,821,043 | B2* | 9/2014 | Schutz | B60R 11/04 |
| | | | | 396/419 |
| 8,988,526 | B2* | 3/2015 | Schutz | B60R 11/04 |
| | | | | 348/148 |
| 2006/0256459 | A1* | 11/2006 | Izabel | B60R 11/04 |
| | | | | 359/872 |
| 2009/0086088 | A1* | 4/2009 | Lee | G06F 1/1626 |
| | | | | 348/374 |
| 2013/0229520 | A1* | 9/2013 | Aimura | G06K 9/00805 |
| | | | | 348/148 |
| 2014/0063245 | A1* | 3/2014 | Bowers | B60R 1/0607 |
| | | | | 348/148 |
| 2016/0196748 | A1* | 7/2016 | Yellambalase | G06K 9/00798 |
| | | | | 340/435 |
| 2016/0316114 | A1* | 10/2016 | Buss | B60R 11/04 |
| 2017/0064161 | A1* | 3/2017 | Buss | H04N 5/2252 |
| 2017/0075351 | A1* | 3/2017 | Liu | H04N 5/2251 |
| 2017/0163863 | A1* | 6/2017 | Gomez Timoneda | |
| | | | | H04N 5/2259 |
| 2017/0271819 | A1* | 9/2017 | Hehir | H01R 13/6583 |
| 2018/0141501 | A1* | 5/2018 | Buss | B60R 11/04 |
| 2018/0272958 | A1* | 9/2018 | Brouwer | B60S 1/54 |
| 2019/0118728 | A1* | 4/2019 | Oba | H04N 5/247 |
| 2019/0126847 | A1* | 5/2019 | Berne | H04N 5/2253 |
| 2019/0161012 | A1* | 5/2019 | Kim | H04N 7/181 |
| 2020/0247331 | A1* | 8/2020 | Bigoness | B60R 11/04 |

FOREIGN PATENT DOCUMENTS

| | | | | | |
|---|---|---|---|---|---|
| KR | 20070063485 | * | 6/2007 | | B60R 1/08 |
| WO | WO-2016177577 A1 | * | 11/2016 | | B60R 11/04 |
| WO | WO-2017048126 A1 | * | 3/2017 | | B60R 11/04 |
| WO | WO-2017164067 A1 | * | 9/2017 | | B60R 1/00 |

\* cited by examiner

[ top view ]

FIG. 4

[ top view ]

FIG. 5

[ top view ]

VERTICALLY FOLDABLE CAMERA MONITORING SYSTEM

CROSS-REFERENCE TO RELATED APPLICATION

This application claims under 35 U.S.C. § 119(a) the benefit of Korean Patent Application No. 10-2019-0072673 filed on Jun. 19, 2019, the entire contents of which are incorporated herein by reference.

BACKGROUND

(a) Technical Field

The present disclosure relates to a vertically foldable camera monitoring system, more particularly, to the vertically foldable camera monitoring system including a camera module extendable or retractable in a horizontal direction to provide a field of view for photographing an image at lateral and rear sides of a vehicle while being able to be held in a vertical direction in accordance with a state of the vehicle, and a structure for holding the camera module in a height direction of the camera monitoring system.

(b) Description of the Related Art

Generally, a driver of a vehicle performs lane changes while viewing a rearview mirror centrally installed at a front portion of a passenger compartment and side mirrors. When the driver performs a lane change while observing a side mirror disposed toward a target lane, there may be a problem in that the vehicle may strike a vehicle traveling in a blind spot or a vehicle traveling in front.

Typically side mirrors, which are installed on a vehicle to protrude outside the vehicle, are configured to be folded in a state in which the vehicle is parked or engine-stopped, and as such, may be damaged by physical impact applied thereto during folding thereof.

Recently, a camera mirror system (CMS) has been developed, the CMS having a screen for displaying an external situation around the vehicle.

In a vehicle equipped with such a CMS system, an external situation around the vehicle is photographed by an external camera installed on the vehicle, where the external camera is configured to protrude outside the vehicle, and an image representing the photographed external situation is displayed on a display disposed in a passenger compartment.

Figure 1:
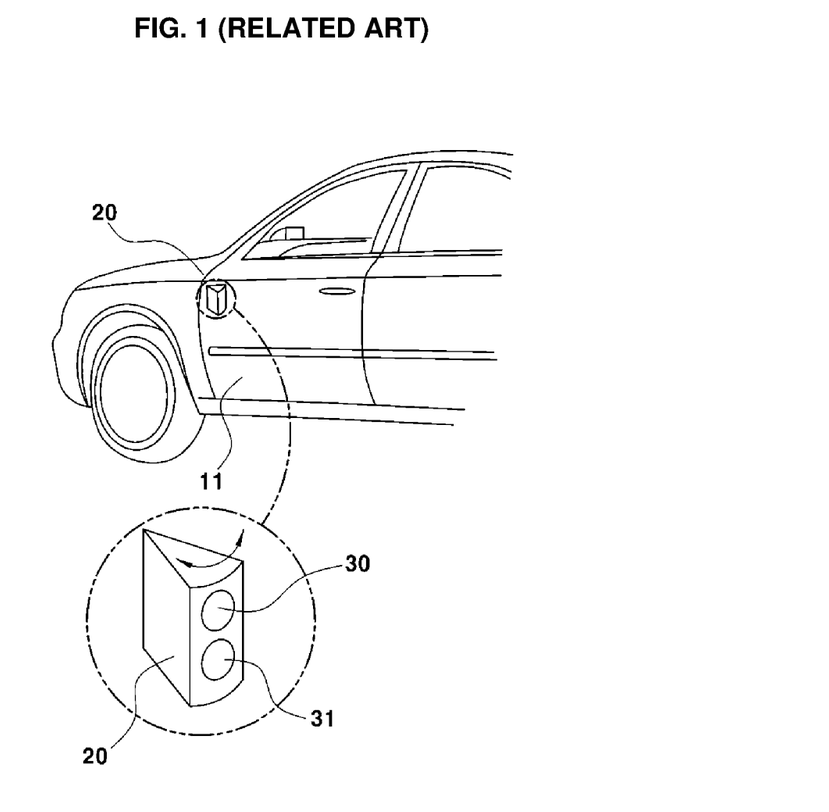
FIG. 1 (RELATED ART) is a perspective view of a vehicle including a conventional camera monitoring system.

FIG. 1 (RELATED ART) shows a configuration of an external camera protruding from an outer side surface of a vehicle through rotation thereof in a conventional case.

As shown in FIG. 1, the vehicle includes an external camera 20 disposed at one side of a door 11. The external camera 20 is configured to rotate toward an inside of the door 11, and includes a first lens 30 and a second lens 31.

In the above-mentioned configuration including a camera mirror system, to provide side and rear images, however, it is necessary to meet a standard for a pendulum test. In particular, a new structure must be capable of absorbing an impact applied to a vehicle in a longitudinal direction of the vehicle.

In addition, it is also necessary to utilize a continuous recording mode in a state in which the vehicle is parked or engine-stopped, using a camera mirror system that protrudes outside the vehicle.

The above information disclosed in this Background section is only for enhancement of understanding of the background of the disclosure and therefore it may contain information that does not form the prior art that is already known in this country to a person of ordinary skill in the art.

SUMMARY

The present disclosure relates to a camera mirror system in which a camera module is movable in forward and rearward longitudinal directions of a vehicle through a configuration enabling a damper unit to be extended or retracted.

The present disclosure also relates to a camera mirror system including a camera module able to be held in a vertical direction and configured to continuously record an external environment of a vehicle in a vertically held state thereof.

In one aspect, the present disclosure provides a vertically foldable camera monitoring system including a base fixedly mounted to a body of a vehicle, and a camera module coupled to the base, the camera module configured to provide a field of view at lateral and rear sides of the vehicle, wherein the camera module includes a damper unit connected to the base and configured to be extended or retracted in length by a driving unit, a support member connected to the damper unit while supporting a camera, and a horizontal bar engaged at a first end with a guide slot provided at the support member while being disposed at a second end adjacent to the damper unit, and wherein the driving unit drives the camera module to be extended or to be rotated in an upward direction.

In a preferred embodiment, the damper unit may include a damper coupled to one end of the support member such that the damper is extended or retracted in length, and a vertical gear coupled to the driving unit, to rotate the camera module in a vertical direction.

In another preferred embodiment, the damper may include a piston coupled, at one end thereof, to the support member, a cylinder for receiving the piston, to allow the piston to be extended or retracted there through, and a tensioner disposed within the cylinder, to apply tension for extension of the piston.

In still another preferred embodiment, the camera module may be folded when the damper unit is extended in length.

In yet another preferred embodiment, the horizontal bar may be provided with a sliding pin movable along the guide slot of the support member.

In still yet another preferred embodiment, the damper unit may further include a link pin coupled to one end of the support member, and the damper unit and the support member may perform relative rotation about the link pin.

In still yet another preferred embodiment, the support member may rotate in a horizontal direction with respect to one end of the damper unit when the damper unit is extended in a longitudinal direction thereof, and one end of the horizontal bar may be disposed within the guide slot of the support member, to determine a radius of rotation of the support member.

In still yet another preferred embodiment, the camera module may be horizontally rotated in a forward direction when the damper unit is retracted in length.

In still yet another preferred embodiment, the camera module may be vertically rotated when the vehicle runs at a predetermined speed or higher.

In still yet another preferred embodiment, the vertically foldable camera monitoring system may further include a control unit for controlling the camera module to continuously photograph an image at the lateral and rear sides of the vehicle when the camera module is held in a state of being vertically rotated with respect to the damper unit.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, reference will be made in detail to various embodiments of the present disclosure, examples of which are illustrated in the accompanying drawings and described below. However, the present disclosure may be embodied in many different forms and should not be construed as limited to the embodiments set forth herein. Rather, these embodiments are provided so that this disclosure will be thorough and complete, and will fully convey the scope of the disclosure to those skilled in the art.

In the present disclosure, "horizontal direction" refers to a width direction of a vehicle in which a camera module 100 (FIG. 2) is extended or retracted by a driving unit 500 (FIG. 2), and "vertical direction" refers to a height direction of the vehicle in which the camera module 100 is moved. Of course, the horizontal direction and the vertical direction may be interpreted as directions different from the above-described directions in accordance with an extension direction of the camera module 100 or a rotation degree of the camera module 100.

The present disclosure relates to a camera monitoring system. In particular, the present disclosure not only provides a structure enabling the camera module 100 to be extended or retracted in accordance with a running environment of the vehicle or at the request of the user, but also provides a vertically foldable camera monitoring system configured to hold the camera module 100 in the height direction of the vehicle.

Figure 2:
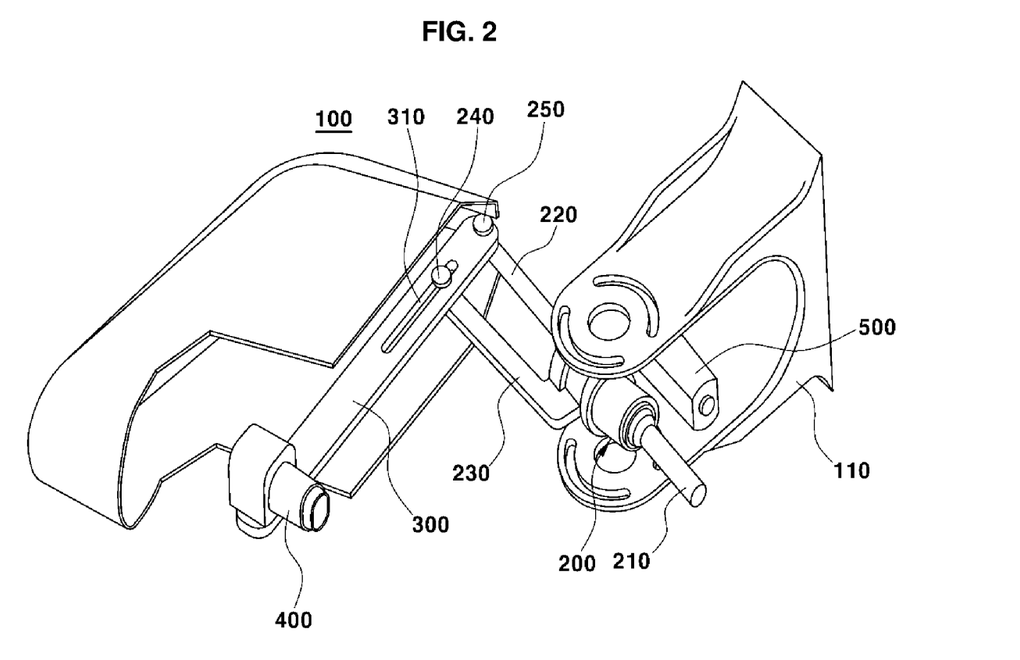
FIG. 2 is a perspective view illustrating a vertically foldable camera monitoring system according to an embodiment of the present disclosure.

Referring to FIG. 2, a damper unit 200 is fastened to a base unit 100 fixedly mounted to a vehicle body 600. The damper unit 200 is configured to allow the camera module 100 to extend in the horizontal direction such that the camera module 100 may photograph an image at lateral and rear sides of the vehicle. The image photographed by the camera module 100 is displayed through a display (not shown) disposed within the vehicle.

FIG. 2 is a perspective view illustrating a vertically foldable camera monitoring system according to an embodiment of the present disclosure.

In accordance with the illustrated embodiment of the present disclosure, the camera module 100 may be disposed at an outermost position on each of opposite side surfaces of an outer plate in the vehicle body 600. The camera module 100 is configured to rotate such that the camera module 100 moves away from or toward the vehicle body in accordance with extension or retraction of the damper unit 200.

Preferably, the camera module 100 is configured to rotate forwards or rearwards in the longitudinal direction of the vehicle in a state of being extended outwards of the vehicle by the damper unit 200. A damper 220, which constitutes the damper unit 200, may include a piston 221 coupled to a support member 300, a cylinder 222 configured to receive the piston 221 such that the piston 221 is extended or retracted through the cylinder 222, and a tensioner 223 configured to apply predetermined tension to the piston 221.

As such, the damper unit 200 is configured to be extended or retracted in the longitudinal direction of the vehicle. When the piston 221 is extended outwards from the cylinder 222, a camera 400 is moved to a position near the outer plate of the vehicle. On the other hand, when the piston 221 is retracted into the cylinder 222, an end of the support member 300, at which the camera 400 is disposed, is rotated toward the front of the vehicle. As such, the damper unit 220 may provide movement corresponding to a pendulum test.

The camera module 100 includes the support member 300, which is coupled, at one end thereof, to the damper unit 200 configured to be extended or retracted by the driving unit 500 or tension of the user. The camera 400 is disposed at the other end of the support member 300.

A link pin 250 is provided at one end of the damper unit 200 coupled to the support member 300 such that one end of the support member 300 is movable in accordance with movement of the damper unit 200 in a longitudinal direction.

Preferably, the link pin 250 is configured to be coupled to one end of the piston 221 while having freedom of rotation. As such, one end of the support member 300, to which the damper unit 200 is coupled, is freely rotatable in accordance with length variation of the damper unit 200.

A horizontal bar 230 may be fastened at a first end to the base 110. An opposite, second end of the horizontal bar 230 is disposed adjacent to a position where the damper unit 200 is coupled to the support member 300. The second end of the horizontal bar 230 is slidably engaged with a guide slot 310 of the support member 300.

The horizontal bar 230 is slidably coupled at the second end to the guide slot 310 provided at the support member 300 in order to determine the radius of rotation of the support member 300 during extension or retraction of the damper unit 200.

Preferably, the horizontal bar 230, which is coupled at the second end to the support member 300, is slidably engaged with the guide slot 310 of the support member 300 by a sliding pin 240 slidable along the guide slot 310.

Further, the guide slot 310 is disposed inside of the support member 300, to which the damper unit 200 is coupled by the link pin 250 disposed at one end of the support member 300, in order to enable the support member 300 to cope with length variation of the damper unit 200.

When the damper unit 200 varies in length, the support member 300 rotates in the horizontal direction about a central axis, that is, the sliding pin 240 coupled to the horizontal bar 230. In this case, it is possible to cope with variation in the distance between one end of the damper unit 200 performing linear movement and the sliding pin 240 occurring during movement of the damper unit 200 by virtue of the guide slot 310.

When the damper unit 200 is extended in length in order to fold the camera module 100 to a position near the outer plate of the vehicle, the sliding pin 240 slides toward one end of the guide slot 310 in accordance with extension of the damper unit 200, for rotation of the support member 300. On the other hand, when the damper unit 200 is retracted in order to meet a standard for a pendulum test, the sliding pin 240 slides toward the other end of the guide slot 310, to determine a radius of rotation of the support member 300.

The driving unit 500 is configured to apply driving force for extension or retraction (unfolding or folding) of the camera module 100 in the horizontal direction and to apply driving force for rotation of the camera module 100 in the height direction of the vehicle. Preferably, a vertical gear 210 may be disposed adjacent to the driving unit 500, to receive rotational force from the driving unit 500. The vertical gear 210 transmits the received rotational force to the camera module 100, thereby causing the camera module 100 to rotate in the vertical direction of the vehicle.

The camera 400 may be adjusted in accordance with the position of the camera module 100. When the camera module 100 is extended or retracted in the horizontal direction, the camera 400 may be adjusted such that an image photographed by the camera 400 is prevented from being varied in accordance with extension or retraction of the camera module 100.

Preferably, a control unit (not shown) is provided in accordance with an embodiment of the present disclosure in order to compensate the focus of the camera 400 in accordance with a horizontal rotational angle of the camera module 100 to output a uniform image.

In addition, an axis of the camera 400 may be adjusted such that an image photographed even when the camera module 100 is rotated in the vertical direction is the same as an image photographed in an extended (unfolded) state of the camera module 100.

In particular, the control unit according to the illustrated embodiment of the present disclosure is configured to adjust a photographing angle in accordance with horizontal and vertical positions of the camera module 100.

Figure 3:
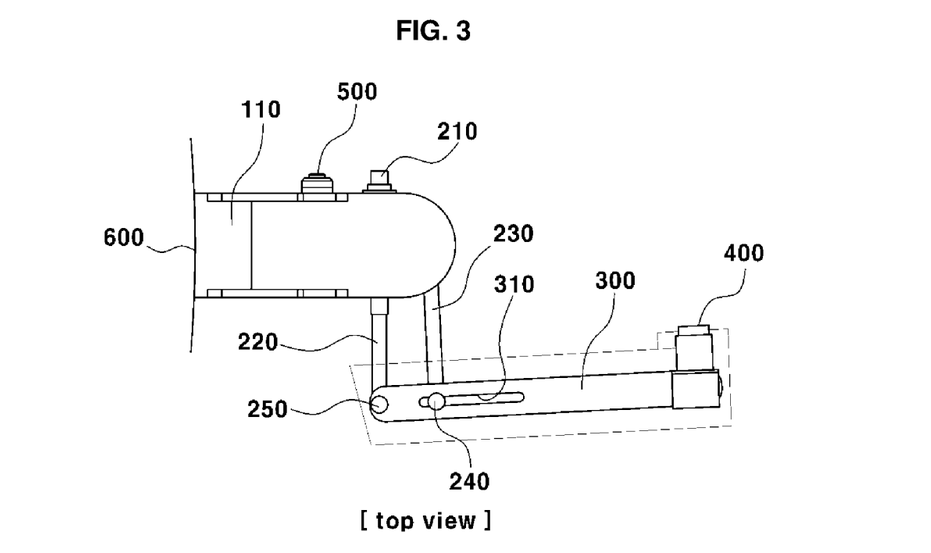
FIG. 3 is a plan view illustrating an unfolded state of the vertically foldable camera monitoring system according to the illustrated embodiment of the present disclosure.

FIG. 3 is a plan view illustrating an extended state of the camera module 100 in the vertically foldable camera monitoring system according to the illustrated embodiment of the present disclosure.

As illustrated in FIG. 3, the camera monitoring system includes the base 110 disposed at one end of the vehicle body 600, the driving unit 500 disposed inside of the base 110, to apply driving force to the camera module 100, and the vertical gear 210 disposed adjacent to the driving unit 500.

The camera monitoring system also includes the damper 200 disposed adjacent to the driving unit 500. The damper unit 200 is configured to apply predetermined tension to the piston 221 thereof such that the piston 221 is extended or retracted.

In addition, the camera monitoring system includes the damper unit 200 configured to connect the base 110 and the support member 300. The damper unit 200 is coupled, at one end thereof, to the support member 300. The camera monitoring system further includes the horizontal bar 230, which is disposed adjacent to the damper unit 200 while being slidably engaged at the second end with the guide slot 310. The guide slot 310 is disposed at a middle portion of the support member 300.

Preferably, the piston 221, which is included in the damper unit 220, is coupled, at one end thereof, to the support member 300. The other end of the piston 221 is disposed within the cylinder 222, which is disposed inside of the base 110. The horizontal bar 230 may be fixed at a position adjacent to a damper housing (not shown) disposed to enclose the cylinder 222.

The damper unit 200 is coupled to the support member 300 by the link pin 250 such that one end of the support member 300 rotates about the link pin 250 in accordance with longitudinal movement of the damper unit 200.

The horizontal bar 230 is slidably engaged with the guide slot 310 of the support member 300 by the sliding pin 240. The sliding pin 240 is disposed in the guide slot 240 such that the sliding pin 240 functions as a rotational central axis while sliding along the guide slot 240 in accordance with longitudinal movement of the damper unit 200.

FIG. 3 illustrates a state in which the camera module 100 is extended to enable the camera 400 to photograph an image at lateral and rear sides of the vehicle during driving of the vehicle. In this state, the camera 400 may be maintained to be disposed at a position farthest from the vehicle body 600.

In order to maintain the camera 400 in an unfolded state such that the camera 400 is spaced away from the vehicle body 600, the damper unit 200 is configured to be extended by a predetermined length. In this state, the sliding pin 240 is positioned at a middle portion of the guide slot 310.

Preferably, the control unit controls the extension length of the damper unit 200 in accordance with a speed of the vehicle such that the distance between the vehicle body 600 and the camera 400 is controlled. Accordingly, it may be possible to enhance aerodynamic performance of the vehicle.

On the other hand, the control unit controls the driving unit 500 to rotate the camera module 100 in the vertical direction such that the camera module 100 is held at a position nearest to the vehicle body 600. That is, the driving unit 500 performs driving operation to enhance aerodynamic performance of the vehicle at a predetermined speed of the vehicle or higher.

Figure 4:
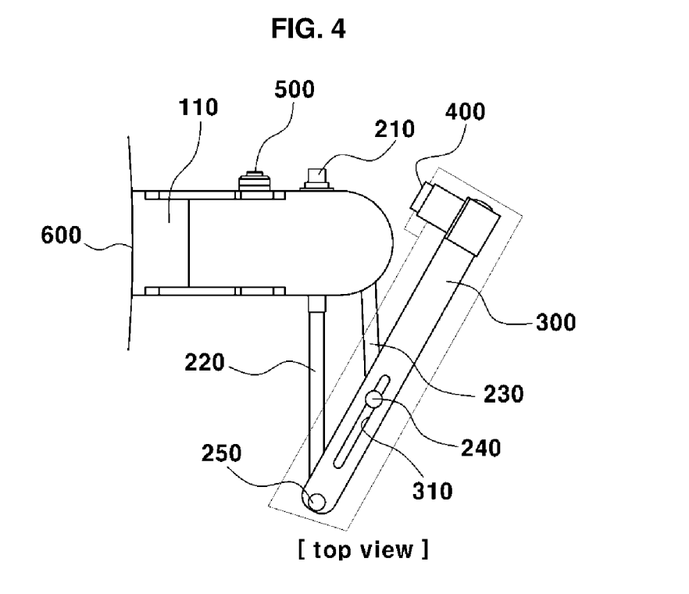
FIG. 4 is a plan view illustrating a folded state of the vertically foldable camera monitoring system according to the illustrated embodiment of the present disclosure.

FIG. 4 is a plan view illustrating a state in which the camera 400 has been moved in the horizontal direction to a position near the vehicle body 600 upon engine stop of the vehicle or at the request of the user.

As illustrated in FIG. 4, the damper unit 200 is fully extended in the longitudinal direction, and the support member 300 coupled to the damper unit 200 by the link pin 250 is rotated about one end of the damper unit 200 through a maximum rotation angle. At this time, the other end of the support member 300 where the camera 400 is disposed is rotated to a position near the outer plate of the vehicle.

When the damper unit 200 is extended to a fully extended state, one end of the horizontal bar 230 slides along the guide slot 310 of the support member 300 by the sliding pin 240. Accordingly, the camera 400 is rotated about the sliding pin 240.

Preferably, one end of the support member 300 coupled to the damper unit 200 is moved in a direction spaced away from the sliding pin 240. In this case, the camera 400 disposed at the other end of the support member 300 is moved to a position near the vehicle body 600 while rotating about the sliding pin 240 under the condition that the radius of rotation of the camera 400 is gradually reduced.

As described above, FIGS. 3 and 4 illustrate the configuration for unfolding or folding the camera module 100 with reference to a horizontal plane of the vehicle in accordance with running or engine-stop of the vehicle.

In particular, in accordance with the illustrated embodiment of the present disclosure, when the camera module 100 is changed from an unfolded state to a folded state, the damper unit 200 is extended in the longitudinal direction of the vehicle, and the support member 300 is moved along the damper unit 200 such that the distance between the link pin 250 and the sliding pin 240 increases. As such, the camera 400 disposed at the other end of the support member 300 is moved in a slanted manner or rotationally moved to a position near the vehicle body 600.

Preferably, in an embodiment of the present disclosure, the other end of the support member 300 where the camera 400 is disposed rotates continuously while gradually reducing the radius of rotation thereof until the damper unit 200 is extended to a maximum length, and thus moves to a position near the vehicle body 600.

Figure 5:
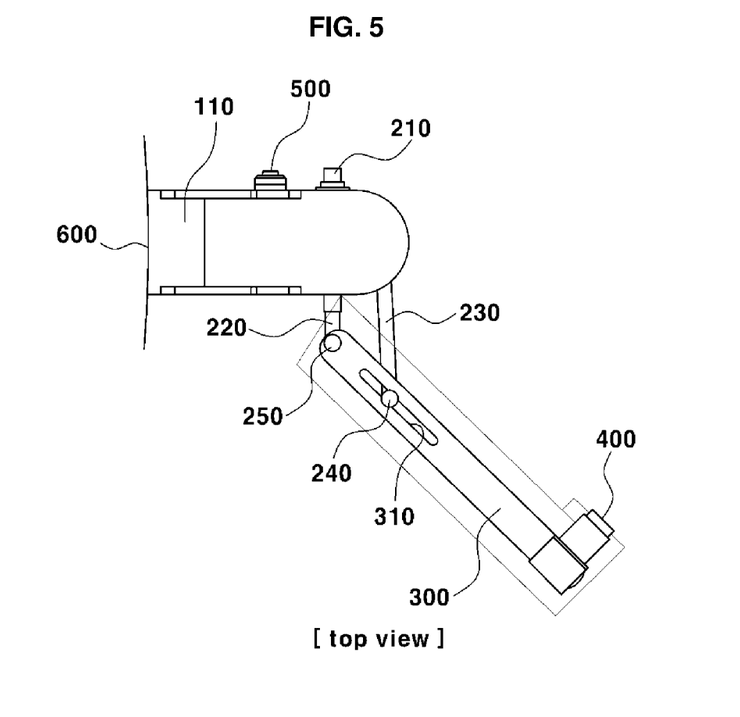
FIG. 5 is a plan view illustrating a forwardly folded state of the vertically foldable camera monitoring system according to the illustrated embodiment of the present disclosure.

FIG. 5 illustrates a configuration of the camera monitoring system in which the camera module 100 is rotatable in a direction opposite to a folding direction thereof by external force, differently from the configuration in which the camera module 100 is rotatable by the driving unit 500.

As illustrated in FIG. 5, the camera monitoring system according to the illustrated embodiment of the present disclosure is configured to rotate forwards by a predetermined angle in the horizontal plane of the vehicle in order to meet a standard for a pendulum test. In this case, the damper unit 200 is configured to be fully retracted, and the support member 300 is configured such that one end thereof where the camera 400 is disposed rotates forwards of the vehicle.

Preferably, one end of the support member 300 where the camera 400 is disposed is rotatable in accordance with application of driving force at the request of the user. Otherwise, the support member 300 may be rotated toward the front side of the vehicle by external force applied thereto.

Even when external force is applied to the support member 300 in a direction opposite to the illustrated direction, that is, a direction toward the rear side of the vehicle, the same configuration as the configuration illustrated in FIG. 4 may be employed. That is, the damper unit 200 may be extended in a longitudinal direction, and one end of the support member 300 where the camera 400 is disposed may be rotated toward the rear side of the vehicle.

Figure 6:
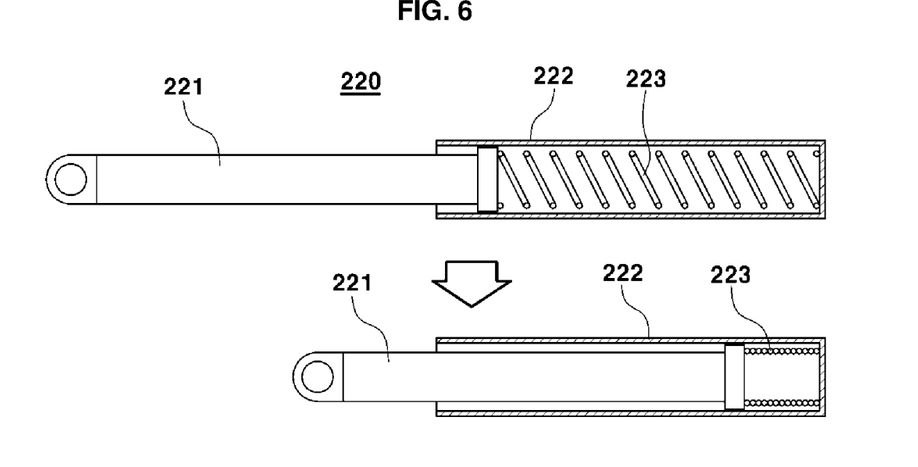
FIG. 6 is a view illustrating a damper in the vertically foldable camera monitoring system according to the illustrated embodiment of the present disclosure.

As illustrated in FIG. 6, the above-described damper unit 200 may include the piston 221 coupled to the support member 300, the cylinder 222, which has an inner space for receiving the piston 221 such that the piston 221 is extended or retracted through the inner space, and the tensioner 223 disposed within the cylinder 222, to apply predetermined tension to one end of the piston 221.

The tensioner 223 may be driven by the driver 500 disposed within the base 110 or tension of the user. The tensioner 223 may be configured to perform extension or retraction of the piston 221 in a longitudinal direction.

Accordingly, the damper unit 200 is configured to be retracted or extended in accordance with external force applied to the camera module 100 in a forward or rearward direction with reference to a horizontal plane of the vehicle.

Different forces from the tensioner 223 may be applied to the piston 221 in accordance with different states of the tensioner 223. That is, the tensioner 223 may be configured such that recovery force is applied to the piston 221 in a fully extended state of the piston 221, and tension is applied to the piston 221 in a fully retracted state of the piston 221. Preferably, the tensioner 223 may include a return spring and a fluid.

In particular, the tensioner 223 is configured to provide different elastic forces in accordance with extension and retraction states of the piston 221. Meanwhile, the camera module 100 is configured to move in accordance with external force applied thereto in a forward or rearward direction of the vehicle.

Figure 7:
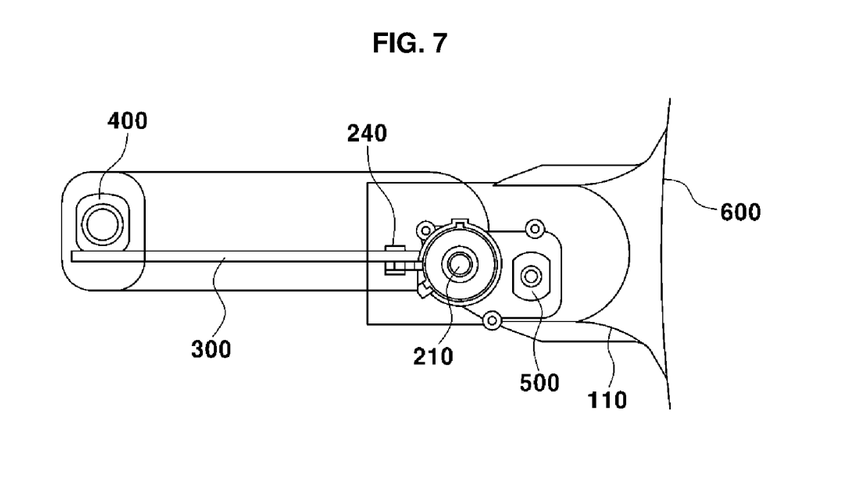
FIG. 7 is a front view illustrating an unfolded state of a camera module in the vertically foldable camera monitoring system according to the illustrated embodiment of the present disclosure.

FIG. 7 is a front view illustrating a configuration in which the camera module 100 is rotated in the vertical direction of the vehicle with reference to the base 110 in accordance with an embodiment of the present disclosure.

As illustrated in FIG. 7, the camera module 100 includes the camera 400, which is configured to be unfolded outwards of the vehicle body 600 of the vehicle when viewed forwards from the rear side of the vehicle, and the support member 300, which is configured to be coupled to the camera 400 while being coupled to the damper unit 200.

Further, the camera module 100 includes the horizontal bar 230, which is engaged with the guide slot 310 provided at the support member 300. The horizontal bar 230 is configured to slide along the guide slot 310 by the sliding pin 240 disposed within the guide slot 310 when the camera module 100 moves in a horizontal plane of the vehicle.

The camera module 100 also includes the base 110 disposed adjacent to the vehicle body 600. The base 110 is configured to fixedly mount the camera module 100 to the vehicle body 600 while preventing the driving unit 500 and the vertical gear 210 from being externally exposed.

The driving unit 500 is configured to rotate the camera module 100 about the vertical gear 210 in a vertical direction. Preferably, the vertical gear is configured to have an axis substantially identical to a central axis of the damper. As such, the camera module 100 may rotate about the damper or the vertical gear 210.

Figure 8:
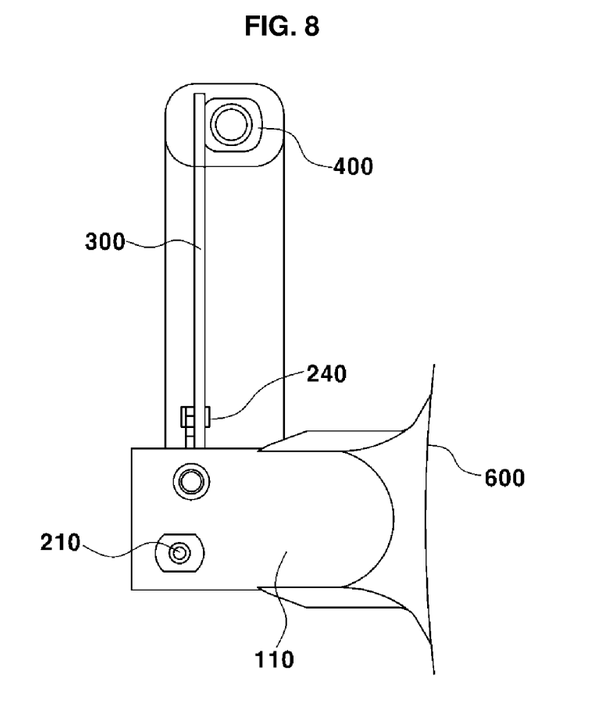
FIG. 8 is a front view illustrating a vertically held state of the camera module in the vertically foldable camera monitoring system according to the illustrated embodiment of the present disclosure.
Figure 9:
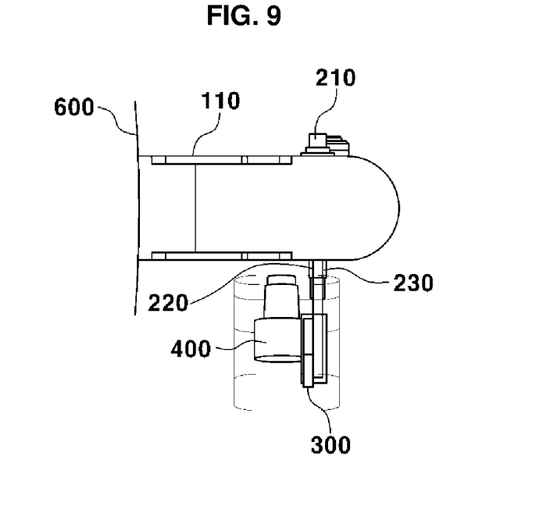
FIG. 9 is a plan view illustrating the vertically held state of the camera module in the vertically foldable camera monitoring system according to the illustrated embodiment of the present disclosure.

FIGS. 8 and 9 illustrate a state in which the camera module 100 is held in a vertical direction with reference to the base 110 in accordance with an embodiment of the present disclosure.

FIG. 8 illustrates a front view of the camera monitoring system in which the camera module 100 is held in a vertical direction through rotation thereof. FIG. 9 illustrates a plan view of the camera monitoring system.

FIGS. 8 and 9 illustrate the camera module 100 rotated about the vertical gear 210 in the vertical direction of the vehicle. Referring to FIGS. 8 and 9, the camera 400 is disposed over the base 110 while being disposed adjacent to the vehicle body 600.

Preferably, the camera module 100 is configured to form an angle of 100° with respect to the base 110.

The control unit (not shown) performs control operation to rotate the camera module 100 such that the camera module 100 is held in the vertical direction of the vehicle, upon determining that the vehicle runs at a predetermined speed or higher. That is, the camera module 100 may be positioned to enhance aerodynamic performance of the camera monitoring system.

In addition, the control unit is configured to photograph an outside of the vehicle through the camera 400 under predetermined conditions when the camera module 100 is held in the vertical direction at the request of the user.

That is, the control unit is configured to perform photographing of an external environment of the vehicle through the camera monitoring system held in the vertical direction during parking or engine-stop of the vehicle or at the request of the user. Accordingly, there may be an effect of enhancing security of the vehicle during parking or engine-stop of the vehicle.

In the case in which the camera module 100 can be held in the vertical direction, movement of the camera module 100 in the vertical direction may be achieved in a horizontally unfolded or folded state of the camera module 100, and unfolding or folding of the camera module 100 may be achieved in a vertically held state of the camera module 100.

As apparent from the above description, in accordance with the illustrated embodiment of the present disclosure, the camera monitoring system includes the camera module 100 configured not only to be folded or unfolded in the horizontal direction, but also to be held in the vertical direction through rotation thereof in the vertical direction. As such, the camera monitoring system, which is variable to various shapes at the request of the user, is provided.

In particular, the present disclosure provides a vertically foldable camera monitoring system including a camera module structure capable of folding and unfolding the camera module 100 with reference to a horizontal plane of the vehicle, and a multi-directionally foldable camera module structure capable of rotating the camera module 100 in the vertical direction with reference to the base 110.

The present disclosure may provide the following effects in accordance with the illustrated embodiments, the above-described configurations, the combinations of the configurations, and use relations thereof.

The present disclosure provides a camera mirror system in which a camera module is movable in forward and rearward longitudinal directions of a vehicle, thereby being capable of meeting a standard for a pendulum test.

In addition, the present disclosure provides a camera module capable of continuously recording an external environment of a vehicle during parking or engine-stop of the vehicle, and thus provides an effect of enhancing security of the vehicle during parking or engine-stop of the vehicle.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:
1. A vertically foldable camera monitoring system, comprising:
   a base fixedly mounted to a body of a vehicle; and
   a camera module coupled to the base, the camera module configured to provide a field of view at lateral and rear sides of the vehicle,
   wherein the camera module comprises:
      a damper unit connected to the base and configured to be extended or retracted in length by a driving unit,
      a support member connected to the damper unit while supporting a camera, and
      a horizontal bar engaged at a first end with a guide slot provided at the support member while being disposed at a second end adjacent to the damper unit, and
   wherein the driving unit drives the camera module to be extended or to be rotated in an upward direction, and
   wherein the support member rotates in a horizontal direction with respect to one end of the damper unit when the damper unit is moved in a longitudinal direction thereof.

2. The vertically foldable camera monitoring system according to claim 1, wherein the damper unit comprises:
- a damper coupled to one end of the support member such that the damper is extended or retracted in length; and
- a vertical gear coupled to the driving unit, to rotate the camera module in a vertical direction.

3. The vertically foldable camera monitoring system according to claim 2, wherein the damper comprises:
- a piston coupled, at one end thereof, to the support member;
- a cylinder for receiving the piston, to allow the piston to be extended or retracted therethrough; and
- a tensioner disposed within the cylinder, to apply tension for extension of the piston.

4. The vertically foldable camera monitoring system according to claim 1, wherein the camera module is folded when the damper unit is extended in length.

5. The vertically foldable camera monitoring system according to claim 1, wherein the horizontal bar is provided with a sliding pin movable along the guide slot of the support member.

6. The vertically foldable camera monitoring system according to claim 1, wherein:
- the damper unit further comprises a link pin coupled to one end of the support member; and
- the damper unit and the support member perform relative rotation about the link pin.

7. The vertically foldable camera monitoring system according to claim 1, wherein:
- the first end of the horizontal bar is disposed within the guide slot of the support member, to determine a radius of rotation of the support member.

8. The vertically foldable camera monitoring system according to claim 1, wherein the camera module is horizontally rotated in a forward direction when the damper unit is retracted in length.

9. The vertically foldable camera monitoring system according to claim 1, wherein the camera module is vertically rotated when the vehicle runs at a predetermined speed or higher.

10. The vertically foldable camera monitoring system according to claim 1, further comprising:
- a control unit for controlling the camera module to continuously photograph an image at the lateral and rear sides of the vehicle when the camera module is held in a state of being vertically rotated with respect to the damper unit.

11. The vertically foldable camera monitoring system according to claim 1, wherein the camera module is horizontally rotated in a backward direction when the damper unit is extended lengthwise.

* * * * *